(12) United States Patent
Joos et al.

(10) Patent No.: US 7,096,670 B2
(45) Date of Patent: Aug. 29, 2006

(54) METHOD FOR IGNITING THE COMBUSTION CHAMBER OF A GAS TURBINE UNIT AND AN IGNITION DEVICE FOR CARRYING OUT THE METHOD

(75) Inventors: Franz Joos, Hamburg (DE); Marcel Stalder, Klingnau (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/936,486

(22) Filed: Sep. 9, 2004

(65) Prior Publication Data
US 2005/0053876 A1  Mar. 10, 2005

Related U.S. Application Data

(63) Continuation of application No. PCT/CH03/00133, filed on Feb. 21, 2003.

(30) Foreign Application Priority Data
Mar. 14, 2002  (DE) ................. 102 11 141

(51) Int. Cl.
*F02C 7/264* (2006.01)
*F02C 7/22* (2006.01)
(52) U.S. Cl. .............. 60/776; 60/39.821; 60/39.826
(58) Field of Classification Search ............. 60/39.821, 60/39.826, 776
See application file for complete search history.

(56) References Cited

U.S. PATENT DOCUMENTS

| 3,994,232 | A | 11/1976 | Rakowsky et al. |
| 4,699,588 | A | 10/1987 | Zinn et al. |
| 5,109,669 | A | 5/1992 | Morris et al. |
| 6,199,370 | B1 * | 3/2001 | Kessaev et al. .............. 60/212 |
| 6,322,353 | B1 * | 11/2001 | Stalder et al. .............. 431/263 |
| 6,571,549 | B1 * | 6/2003 | Stanek ......................... 60/262 |
| 6,584,774 | B1 * | 7/2003 | Stanek ......................... 60/740 |
| 6,718,773 | B1 * | 4/2004 | Stalder et al. ................. 60/776 |
| 2001/0001360 | A1 | 5/2001 | Kessaev et al. |

FOREIGN PATENT DOCUMENTS

| DE | 38 18 158 C2 | 8/1991 |
| DE | 39 41 635 C2 | 3/1993 |
| DE | 689 06 983 T2 | 9/1993 |
| DE | 690 15 328 T2 | 5/1995 |
| EP | 0 992 661 A1 | 4/2000 |
| WO | 03/076782 A1 | 9/2003 |

OTHER PUBLICATIONS

Search Report from PCT/CH03/00133 (Jun. 2, 2003).
Search Report from DE 102 11 141.3 (Jul. 23, 2002).
Abstract of RU 2064132-C1 (Jul. 20, 1996).
Abstract of RU 2057996-C1 (Apr. 10, 1996).

* cited by examiner

*Primary Examiner*—Charles G. Freay
(74) *Attorney, Agent, or Firm*—Cermak & Kenealy, LLP; Adam J. Cermak

(57) ABSTRACT

In a method for igniting the combustion chamber of a gas turbine unit, a safely working ignition and a long lifetime of the ignition device (10) is achieved by discharging a compressed gas with a supercritical pressure ratio through a nozzle (21) and heating it up to a temperature sufficient to ignite hydrocarbons by interacting with a resonance tube (19) arranged behind said nozzle (21), and using said heated-up gas to directly or indirectly ignite a fuel/air mixture introduced into said combustion chamber.

17 Claims, 5 Drawing Sheets

METHOD FOR IGNITING THE COMBUSTION CHAMBER OF A GAS TURBINE UNIT AND AN IGNITION DEVICE FOR CARRYING OUT THE METHOD

This application is a Continuation of, and claims priority under 35 U.S.C. § 120 to, International application number PCT/CH03/00133, filed 21 Feb. 2003, and claims priority under 35 U.S.C. § 119 to German application number 102 11 141.3, filed 14 Mar. 2002, the entireties of both of which are incorporated by reference herein.

BACKGROUND OF THE INVENTION

1. Field of the Invention

The present invention concerns the field of gas turbines. It concerns a method for igniting the combustion chamber of a gas turbine unit and an ignition device for carrying out the method.

2. Brief Description of the Related Art

The continuous combustion in the combustion chamber of a gas turbine is initiated when an external ignition source ignites the combustion mixture (usually an air/fuel mixture). Usually this is accomplished with electric sparks that ignite the mixture in the combustion chamber either directly or indirectly using a so-called pilot burner. Alternative ignition sources provide the required energy via a glowing surface or a laser light source. The ignition plug for generating the ignition spark requires high electric voltage directly in the combustion chamber. The supply line, especially the isolation of this high voltage line that must be comprised of ceramics due to the existing temperatures at the compressor exit, is relatively susceptible to heat expansion and vibrations. This is why such ignition systems are comparatively sensitive and must be replaced relatively often during the life of a gas turbine. This could result in low availability of the unit. The other known ignition by way of an auto-ignition avoids the supply of high voltages; however, the ceramic glow element itself currently does not have a long enough lifecycle.

In a completely different technical field, i.e., in military applications, it is necessary to initiate a chemical reaction with very simple, robust devices. This led to the development of so-called Resonance Igniters that utilize the heating of gas for ignition purposes with the gas supercritically dissipating its pressure energy into heat in a resonance tube. Usually solid reaction mixtures or—using a $H_2/O_2$ and/or $H_2$/air ignition flame—other fuels are being ignited (ref. for example U.S. Pat. Nos. 3,994,232 or 5,109,669).

SUMMARY OF THE INVENTION

The aspect of the invention includes a method for igniting the combustion chamber of a gas turbine unit as well as an ignition device for carrying out the method that avoids the disadvantages of known methods and devices and that is characterized by a simple and sturdy design, a high level of availability and operational safety, the absence of electric devices and easy integration into existing units.

A principle of the present invention is to use the known resonance ignition for igniting the combustion chamber of a gas turbine unit in which a compressed gas with a super-critical pressure ratio is discharged through a nozzle and, interacting with a resonance tube arranged behind the nozzle, is heated up to a temperature that is suitable for igniting carbon hydroxide and in which the heated-up gas is used directly and/or indirectly for igniting the fuel/air mixture introduced in the combustion chamber.

In a preferred embodiment the combustion chamber comprises a combustion space to which a flame tube of a pilot burner is connected that discharges into the combustion space of the combustion chamber. Ignition fuel and ignition air are introduced into the flame tube and the ignition fuel/ignition air mixture is ignited in the flame tube.

It is possible to use different gases for the resonance ignition. The preferred compressed gas is air because it does not require any additional heating up of the gas.

If the compressed gas used is something other than air, especially nitrogen, ignition air is used for the ignition and the ignition air requires heating up.

In accordance with a preferred embodiment of the invention an ignition space that leads into the flame tube is arranged between the flame tube and the resonance tube. When part of the air that is heated in the resonance tube is supplied to the ignition space through an ignition opening in the resonance tube, it is mixed with the ignition fuel in the chamber and ignites. The remaining part of the discharged air in the resonance tube preferably is removed passed the ignition space into the flame tube.

Alternatively it is possible for the ignition fuel/ignition air mixture in the flame tube to be ignited when it comes into contact with a heated surface of the resonance tube.

It also is possible for the entire decompressed air in the resonance tube to be used for igniting the ignition fuel/ignition air mixture.

The method in accordance with the invention is especially easy to implement when the already present fuel in the gas turbine is being used as ignition fuel.

However, it also is possible to use an ignition fuel that is different from the fuel in the gas turbine, especially methane or propane.

Ignitability can be improved if oxygen is added to the air that is heated up in the resonance tube and/or to the remaining air that is discharged in the resonance tube.

It is especially easy to integrate the method in a gas turbine unit with a compressor for compressing the combustion air when the compressed air for igniting the combustion chamber is removed from the compressor and/or an external ignition air supply.

The ignition device in accordance with the invention preferably is designed so that a flame tube is connected to the combustion space of the combustion chamber and that at least part of the gas that is discharged through the nozzle into the resonance tube flows into the flame tube through an exit channel arranged outside the resonance tube.

In a further development of this embodiment the entire gas discharged through the nozzle into the resonance tube flows through the exit channel outside the resonance tube whereby a heated surface of the resonance tube is adjacent to the flame tube.

In a further development of this embodiment the resonance tube is adjacent to an ignition chamber which in turn flows into the flame tube. A part of the gas in the resonance tube flows directly from the resonance tube into the combustion chamber through an ignition opening.

BRIEF DESCRIPTION OF THE DRAWINGS

The invention is explained in more detail using exemplary embodiments in connection with the drawing, with the figures showing the following.

DETAILED DESCRIPTION OF THE PREFERRED EMBODIMENTS

Figure 1:
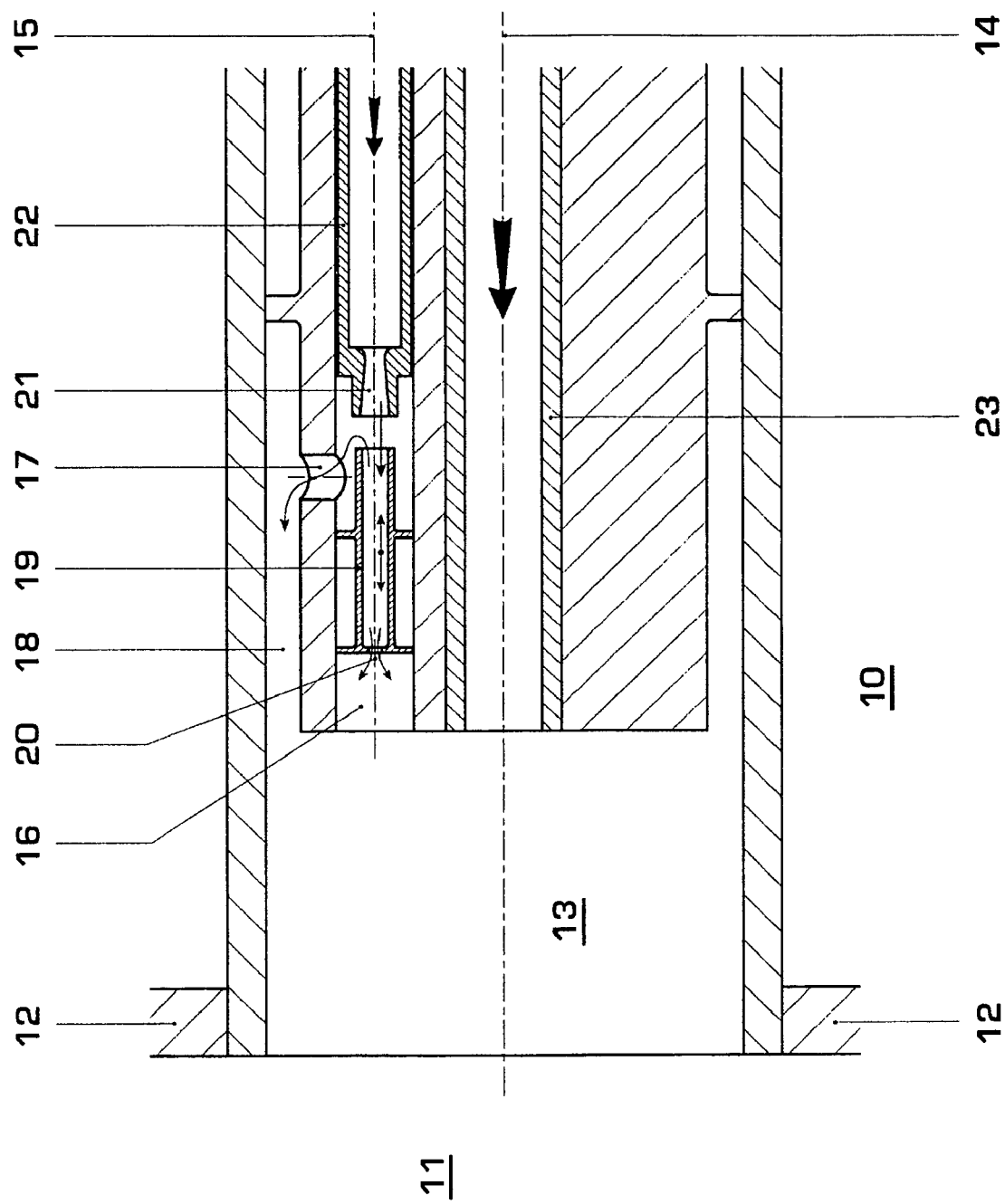
FIG. 1 parts of a longitudinal section of a first preferred exemplary embodiment of an ignition device in accordance with the invention with an ignition space being arranged between flame tube and resonance tube in which directly heated gas exits from the resonance tube.

FIG. 1 shows parts of a longitudinal section of a first preferred exemplary embodiment of an ignition device in accordance with the invention. The ignition device 10 is based on a configuration that is described in FIG. 1 of EP-A1-0 992 661. The hot gasses required for driving the gas turbine are generated by combusting a gaseous and/or liquid fuel in combustion space 11 of a combustion chamber (30 in FIG. 3). The combustion space 11 has a lateral combustion space wall 12. A flame tube 13 discharges into the combustion space 11 through an opening in the combustion space wall 12. In the illustrated example the flame tube 13 is concentric as it relates to a central axis 14. Fuel is introduced to the flame tube 13 through a central fuel tube 23.

While in the device according to FIG. 1 of EP-A1-0 992 661 combustion air is introduced into the flame tube through an air supply (70) that concentrically surrounds the fuel tube (23) and an ignition electrode (51) is arranged for the ignition that protrudes into an ignition space (50) that is filled with air and fuel from the fuel tube and the air supply via connecting channels (55, 56), the (sensitive) electric ignition is replaced with a robust resonance ignition in the ignition device 10 according to FIG. 1 of the present application.

The object of the invention is to increase the availability of the gas turbine by providing a robust ignition lance without any electric components. The resonance ignition is based on the following principle: If a compressed gas (e.g. air) is discharged through a nozzle, the gas initially cools off since the pressure energy is converted to kinetic energy. If, however, it is discharged with an exceedingly supercritical pressure ratio, the pressure inside the gas is much higher than in the surroundings. This leads to post expansions that discharge the pressure to ambient pressure through compression waves. These compression waves dissipate strongly, i.e. the existing pressure energy is converted to heat. If the flow is decelerated as well, the kinetic energy is also available in the form of heat. This means the largest part of the original pressure energy can be converted to heat.

In the ignition device 10 of FIG. 1 the concentric external air supply is interrupted. Air in an ignition gas tube 22 that runs parallel to the fuel tube 23 is discharged through a nozzle 21 (can also be a Laval nozzle) before it reaches the flame tube. In the space behind the nozzle a resonance tube 19 is arranged in the symmetry axis 15 of the ignition device with the tube being open towards nozzle 21. The gas (air) that flows from the nozzle 21 directly reaches the resonance tube 19. By designing the resonance tube 19 accordingly that is arranged directly at the exit of nozzle 21 it is possible to generate strong temperature increases at the opposite end of the resonance tube 19 that is partially or completely closed. For ignition purposes a small part of the air (ignition air) that is injected into the resonance tube is heated up to above the ignition temperature of hydrocarbons. This ignition air is supplied to a subsequent, separate ignition space 16 arranged between resonance tube 19 and flame tube 13 through a small ignition opening 20 of the resonance tube 19. Here it is mixed with fuel and ignites. The remaining discharged air is removed parallel to the resonance tube 19 and the ignition space through an exit opening 17 and an exit channel 18. However, it is possible to use the remaining air and/or all of the supplied air for igniting the mixture. If compressed air is used as resonance gas, pressure in excess of 10 bar is required to reach the ignition temperature. It is therefore suggested to supply air with pressure around 10 bar (or more) and to heat them to ignition temperature by way of a resonance tube.

The fuel of the gas turbine is to be mainly used as ignition fuel. An alternative is to use other fuels such as methane or propane, for example, that are currently in use.

Figure 2:
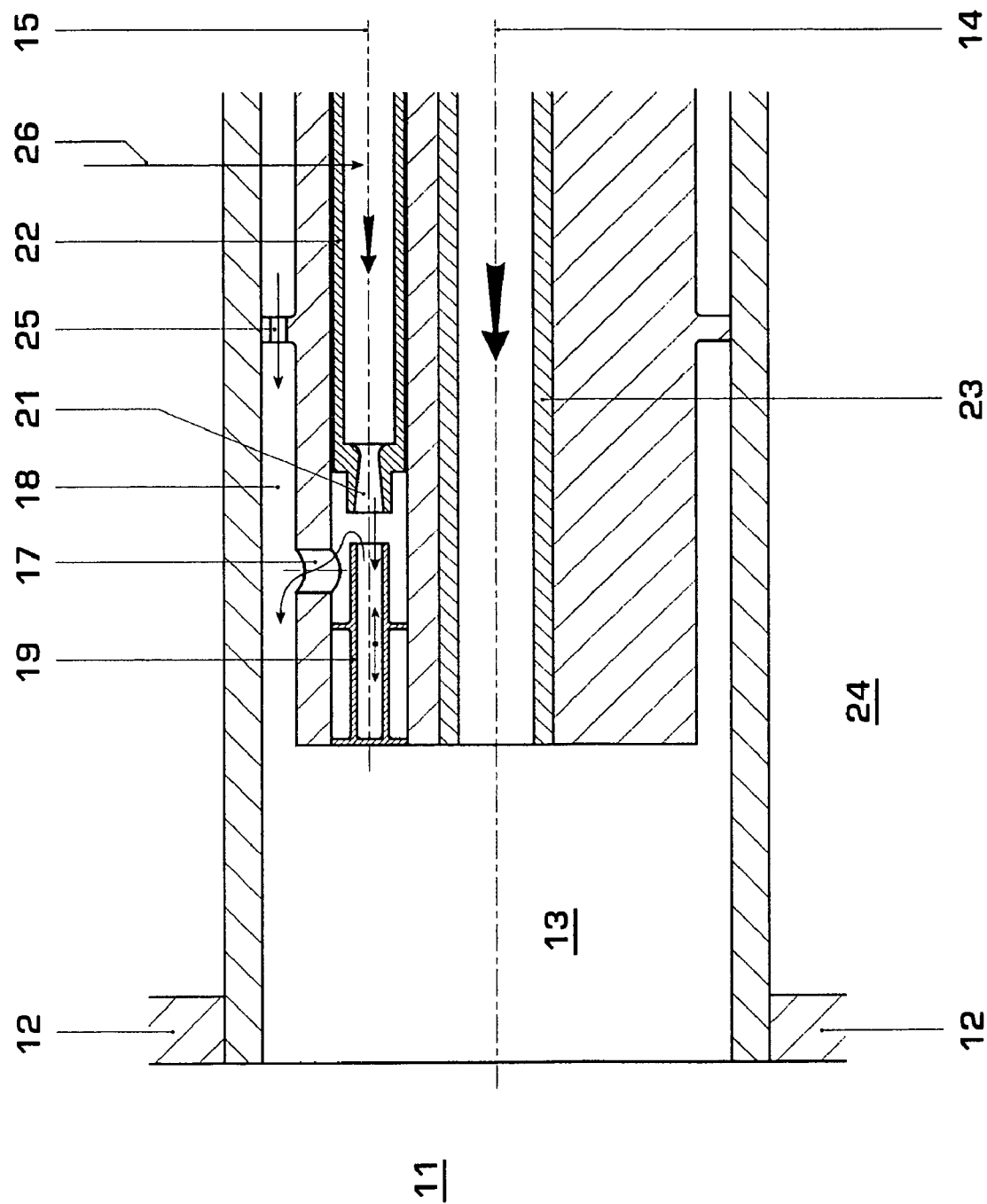
FIG. 2 in a presentation comparable to FIG. 1 a second exemplary embodiment of an ignition device in accordance with the invention in which the resonance tube with a heated surface is directly adjacent to the flame tube.

In the ignition device 24 shown in the exemplary embodiment of FIG. 2 the end of the resonance tube 19 that is opposite the nozzle 21 is completely closed. There is no ignition space so that the closed end of the resonance tube 19 and its heated surface are in direct contact with the gas in the flame tube 13. The entire air that is discharged through nozzle 21 is removed through the exit opening 17 and the exit channel 18 into the flame tube 13. In addition, oxygen 26 can be added to the ignition gas tube 22 and into the exit channel 18 by means of an oxygen channel 25.

Figure 3:
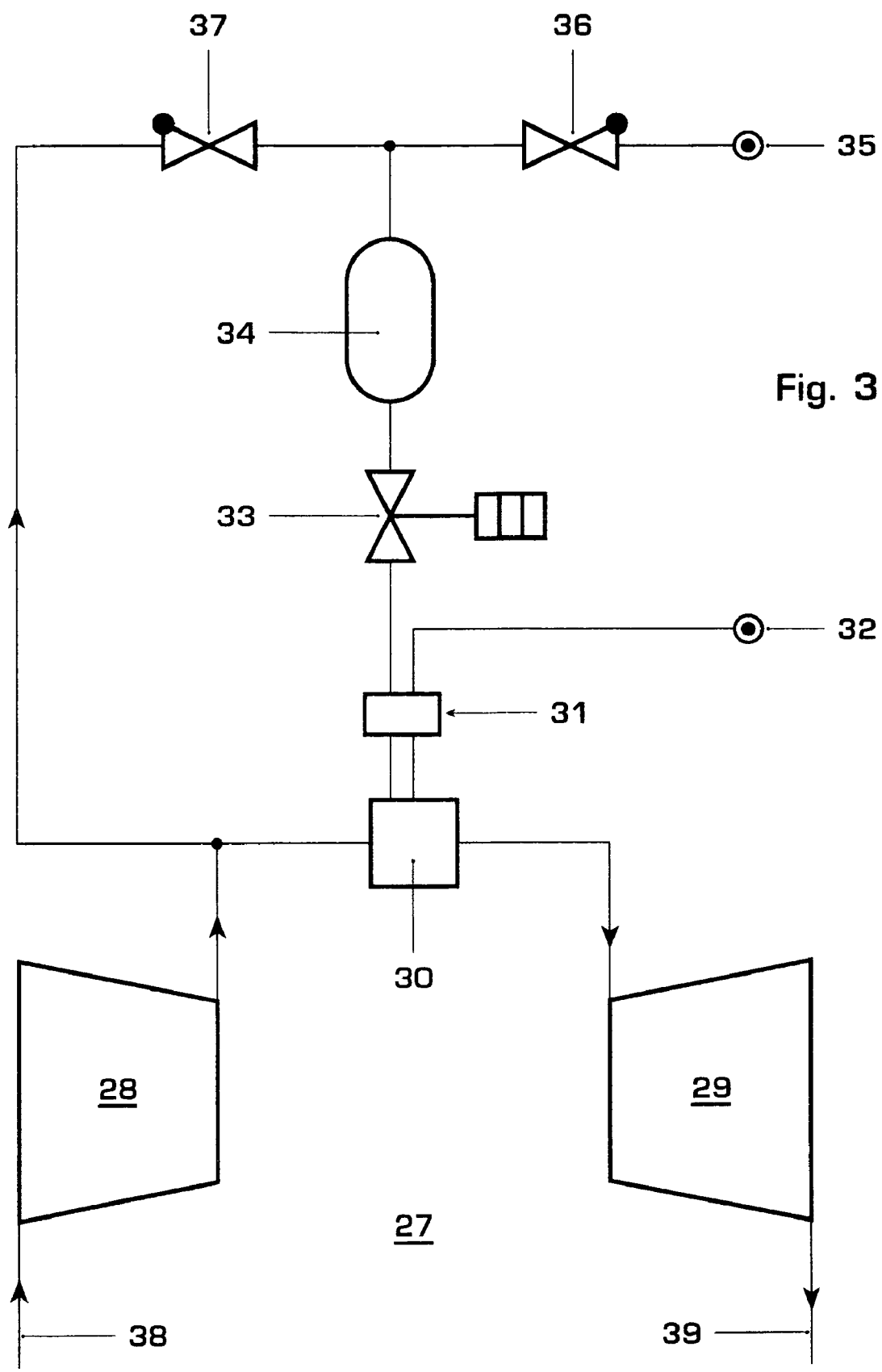
FIG. 3 a device scheme for the supply of compressed air to an ignition device in accordance with the invention that is arranged in a gas turbine unit.

According to FIG. 3 the ignition device 31 can easily be integrated into a gas turbine unit 27: The gas turbine unit 27 comprises a compressor 28 for compressing the combustion air that is supplied via the combustion air inlet, a combustion chamber 30 and a gas turbine 29 in which the hot gasses from the combustion chamber 30 are discharged and then are supplied to an exhaust gas outlet 39 to a flue or waste heat steam generator. Depending on the compressor pressure of the gas turbine 29 the air can be supplied via the gas turbine 29 itself and/or via the external ignition air supply 35. From the two alternative sources the compressed air is supplied to an ignition air storage 34 via check valves 36, 37 and from there it can be fed, as needed, into the ignition device 31 via a valve 33. The necessary ignition fuel is provided via an ignition fuel supply 32. The required resonance heating can be accomplished with a propellant other than air (e.g. $N_2$) if this is more readily available. In this case, however, the necessary ignition air must also be heated. This can be accomplished through a hot surface or a mixture of heated propellant or a part of it.

The ignition by means of the heated up surface of the resonance tube (FIG. 2) is also possible when air is used as a propellant. Ignitability can be improved when oxygen is added to the resonance gas and/or into the remaining discharged air that is to be dissipated.

Figure 4:
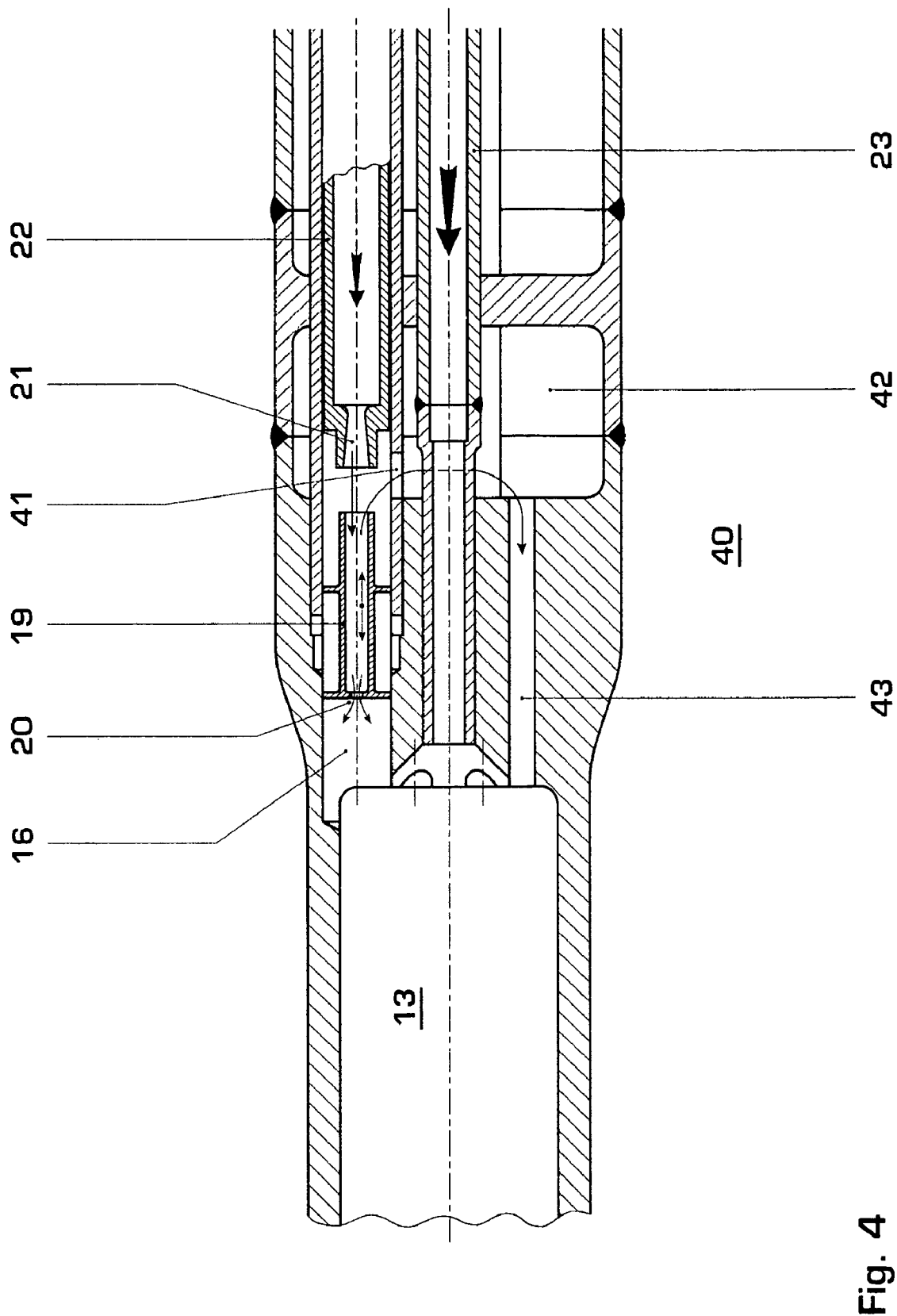
FIG. 4 in a presentation comparable to FIG. 1 a third exemplary embodiment of an ignition device in accordance with the invention in which the resonance ignition is arranged inside a modified ignition torch and FIG. 5 in a presentation comparable to FIG. 1 another exemplary embodiment of an ignition device in accordance with the invention in which the resonance tube is directly connected to the fuel tube.

In principle the described method can be integrated into different geometires. Due to its compact design, however, it is especially advantageous to design the resonance tube 19 such that the currently electric component (FIG. 1 of EP-A1-0 992 661) is simply replaced with the resonance tube with compressed air supply 21, 22. Analogous to FIGS. 1 and 2 it is possible to use a resonance ignition device comprising a resonance tube 19, nozzle 21 and ignition gas tube 22 according to FIG. 4. The resulting ignition device 40 can be integrated into a common ignition gas flare. The remaining discharged air that is not introduced into the ignition space 16 through the ignition opening 20, reaches an exit chamber 42 via an exit opening 41 and from there reaches the flame tube 13 through a connecting channel 43.

Figure 5:
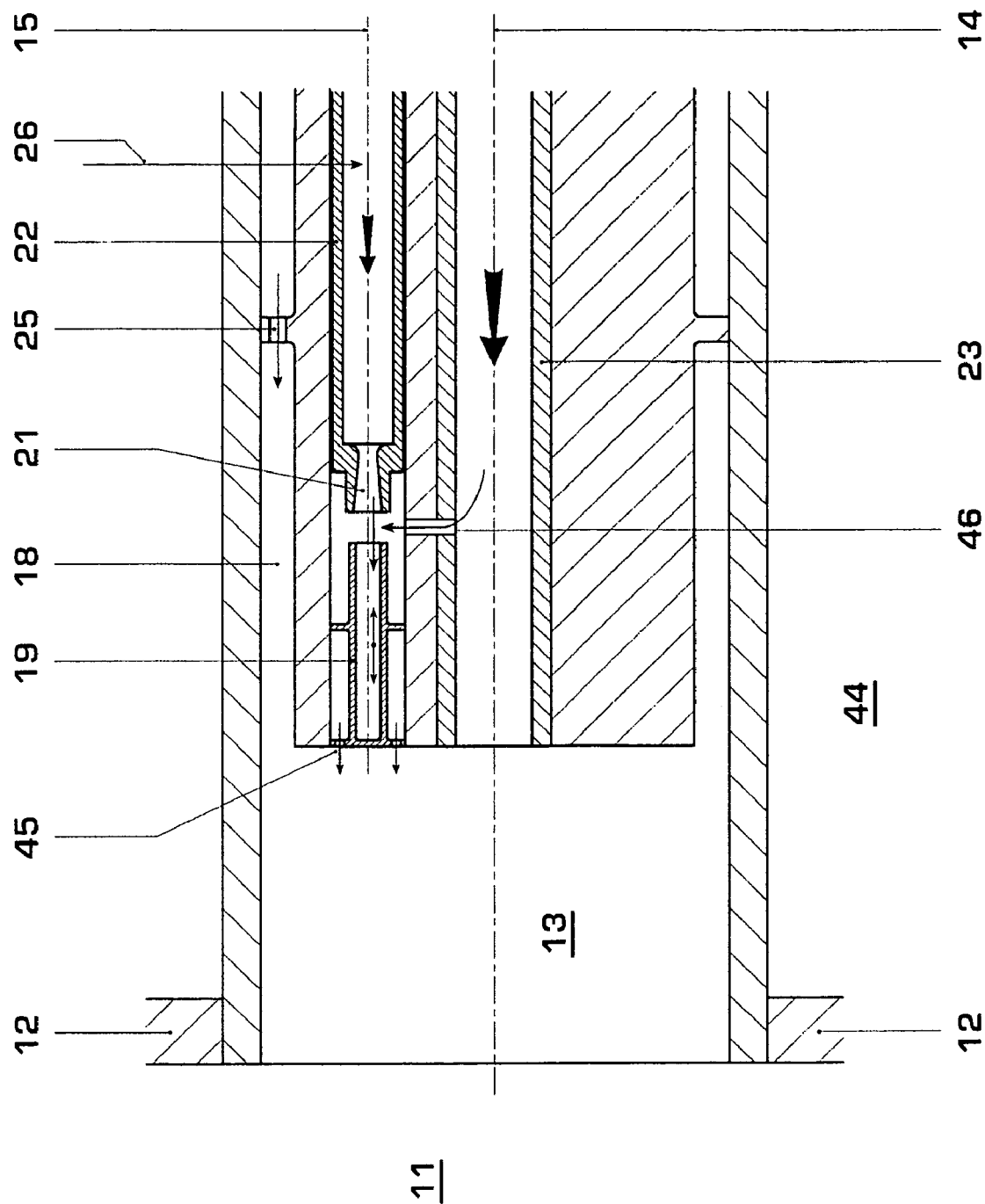

In the exemplary embodiment in FIG. 5 fuel is added through a comparatively narrow connecting channel 46 from the fuel tube 23 to the air that is discharged through nozzle 21 and heated in the resonance tube 19. The resulting mixture is ignited and exits from ignition openings 45 on the closed side of the resonance tube 19 into the flame tube 13 and results in the ignition of the fuel/air mixture in the flame tube 13.

List of Reference Numerals 10,24,40,44 ignition device
11 combustion space
12 combustion space wall
13 flame tube
14 central axis (ignition device)
15 symmetry axis
16 ignition space
17,41 exit opening
18 exit channel
19 resonance tube
20,45 ignition opening
21 nozzle
22 ignition gas tube
23 fuel tube
25 oxygen channel
26 oxygen
27 gas turbine unit
28 compressor
29 gas turbine
30 combustion chamber
31 ignition device
32 ignition fuel supply
33 valve
34 ignition air storage
35 external ignition air supply
36,37 check valve
38 combustion air inlet
39 exhaust gas outlet
42 exit chamber
43,46 connecting channel While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for igniting the combustion chamber of a gas turbine unit, the method comprising:
    discharging a compressed gas with a supercritical pressure ratio through a nozzle;
    heating up said compressed gas to a temperature sufficient to ignite hydrocarbons by interacting with a resonance tube arranged behind said nozzle; and
    using said heated-up gas directly or indirectly to ignite a mixture of air and a fuel, said fuel being introduced into said combustion chamber separately and simultaneously with said discharged compressed gas.

2. A method according to claim 1, wherein the combustion chamber comprises a combustion space to which a flame tube is connected that discharges into the combustion space; and comprising:
    introducing ignition fuel and ignition air into the flame tube; and
    igniting the ignition fuel/ignition air mixture in the flame tube.

3. A method according to claim 1, wherein the compressed gas comprises air.

4. A method according to claim 3, wherein an ignition space is arranged between the flame tube and the resonance tube that discharges into the flame tube; and comprising:
    supplying some of the air that is heated up in the resonance tube to the ignition space through an ignition opening in the resonance tube where said supplied air mixes with the ignition fuel and ignites.

5. A method according to claim 4, comprising:
    discharging the remainder of the air discharged into the resonance tube past the ignition space and into the flame tube.

6. A method according to claim 3, comprising:
    igniting the ignition fuel/ignition air mixture in the flame tube by contact with a heated-up surface of the resonance tube.

7. A method according to claim 3, comprising:
    using all the air discharged into the resonance tube to ignite the ignition fuel/ignition air mixture.

8. A method according to claim 3, comprising:
    using the combustion fuel of the gas turbine as ignition fuel.

9. A method according to claim 3, comprising:
    using a fuel other than the fuel of the gas turbine as ignition fuel.

10. A method according to claim 3, comprising:
    adding oxygen to improve the ignitability of the air that is heated up in the resonance tube, to improve the ignitability of the other air discharged into the resonance tube, or both.

11. A method according to claim 3, wherein the gas turbine unit comprises a compressor for compressing the combustion air, and comprising:
    taking the compressed air for igniting the combustion chamber from the compressor, from an external ignition air supply, or both.

12. A method according to claim 1, wherein the compressed gas to be used is not air; and comprising:
    using additional ignition air for ignition purposes; and
    heating up the additional ignition air.

13. A method according to claim 9, wherein said fuel other than the fuel of the gas turbine comprises methane or propane.

14. A method according to claim 12, wherein the compressed gas to be used comprises nitrogen.

15. An ignition device useful for igniting the combustion chamber of a gas turbine unit, the combustion chamber including a combustion space, the ignition device comprising:
    an ignition gas tube;
    a resonance tube;
    a nozzle configured and arranged to be supplied with compressed gas through the ignition gas tube, the resonance tube being arranged behind said nozzle and into which resonance tube gas from the nozzle can flow, the nozzle configured and arranged to be connected to the combustion chamber or the combustion space of the combustion chamber;

an exit channel outside the resonance tube;
a flame tube connected to the combustion space of the combustion chamber with the flame tube discharging into the combustion space;
wherein at least some of the gas discharged through the nozzle into the resonance tube flows via the exit channel into the flame tube;
an ignition space;
wherein the resonance tube is adjacent to the ignition space;
wherein the ignition space discharges into the flame tube;
wherein the resonance tube comprises an ignition opening; and
wherein part of the gas in the resonance tube exits the resonance tube through the ignition opening and flows directly into the ignition space.

16. An ignition device useful for igniting the combustion chamber of a gas turbine unit, the combustion chamber including a combustion space, the ignition device comprising:
 an ignition gas tube;
 a resonance tube;
 a nozzle configured and arranged to be supplied with compressed gas through the ignition gas tube, the resonance tube being arranged behind said nozzle and into which resonance tube gas from the nozzle can flow, the nozzle configured and arranged to be connected to the combustion chamber or the combustion space of the combustion chamber;
 an exit channel outside the resonance tube;
 a flame tube connected to the combustion space of the combustion chamber with the flame tube discharging into the combustion space;
 wherein at least some of the gas discharged through the nozzle into the resonance tube flows via the exit channel into the flame tube;
 a central fuel tube running to the flame tube; and
 wherein the ignition gas tube, the nozzle, and the resonance tube are arranged in series and parallel to the fuel tube.

17. An ignition device in accordance with claim 16, further comprising:
 a connecting channel connecting the resonance tube to the fuel tube.

* * * * *